United States Patent
Sherman

[15] 3,680,787
[45] Aug. 1, 1972

[54] IRRIGATION SYSTEM

[72] Inventor: Roger M. Sherman, 3381 Stevens Creek Blvd., San Jose, Calif. 95117

[22] Filed: July 2, 1971

[21] Appl. No.: 159,138

[52] U.S. Cl. .................239/177, 137/344, 239/212
[51] Int. Cl. ..............................................B05b 3/00
[58] Field of Search .......239/177, 212, 213; 137/344

[56] References Cited

UNITED STATES PATENTS

| | | | |
|---|---|---|---|
| 2,766,996 | 10/1956 | Jacoby | 239/212 X |
| 3,533,557 | 10/1970 | Ingram et al. | 239/212 |
| 3,603,508 | 9/1971 | Ingram et al. | 239/212 |
| 2,730,403 | 1/1956 | Huntley | 239/212 I |
| 3,002,697 | 10/1961 | Jones | 239/212 |

FOREIGN PATENTS OR APPLICATIONS 217,436   9/1958   Australia ......................239/177

Primary Examiner—M. Henson Wood, Jr.
Assistant Examiner—Edwin D. Grant

[57] ABSTRACT

An irrigation system provided with a long pipe supplying irrigation water to a field of predetermined area. One end of the pipe is attached to a fixed water supply pipe by rotatable coupling. The irrigation pipe is provided with supporting wheels which are rotatable on fixed bearings provided to the irrigation pipe at spaced points. The wheels are driven from a drive shaft supported by said fixed bearings alongside of the pipe and the shaft is driven by a stationary electric motor supported on the fixed water supply pipe. Selected wheel drives are provided with a combination brake and clutch device that is controlled by the flexing of the irrigation pipe whereby the selected wheels are driven such that damaging bending of the irrigation pipe is prevented as it is carried around said fixed water supply pipe by said wheels.

10 Claims, 9 Drawing Figures

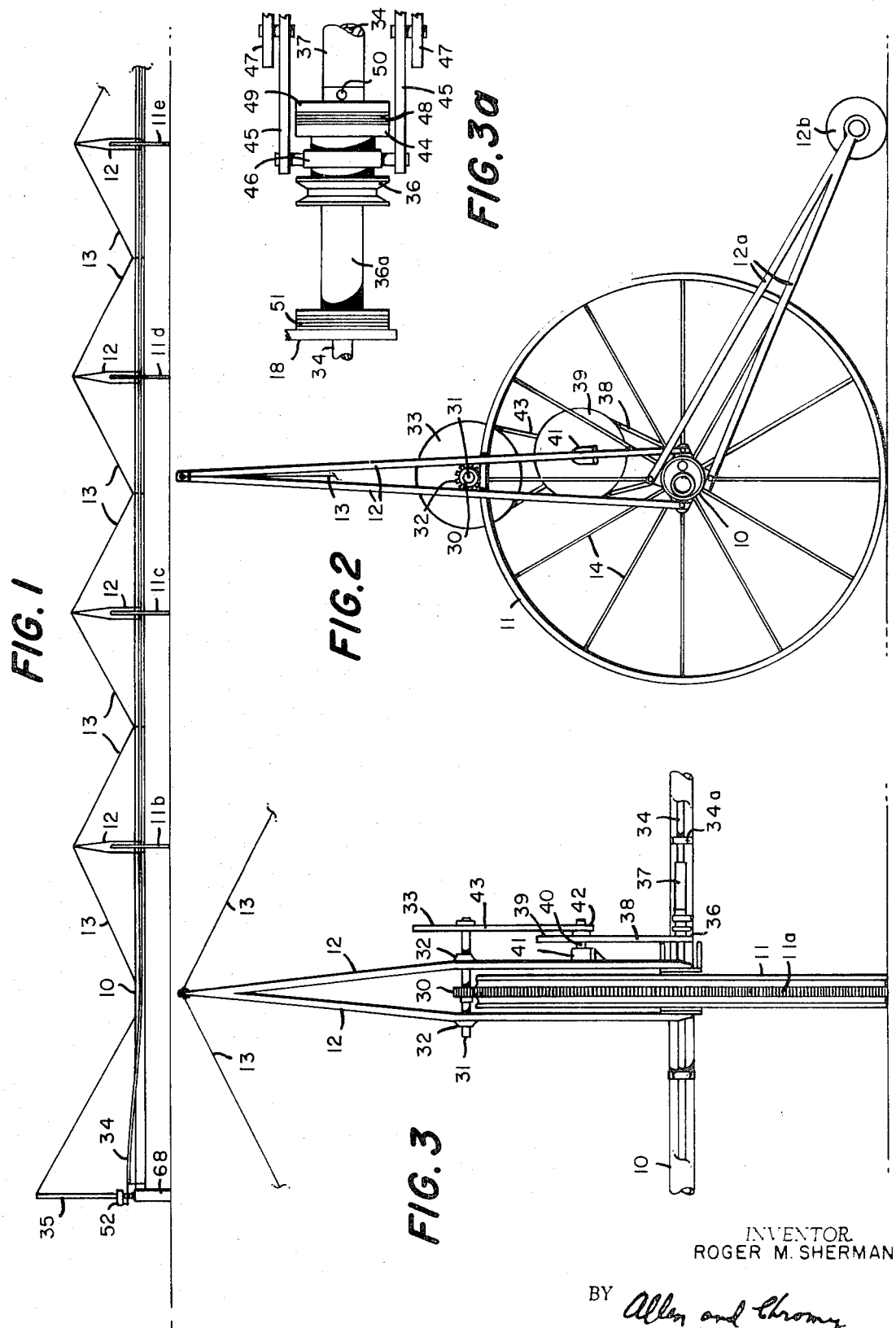

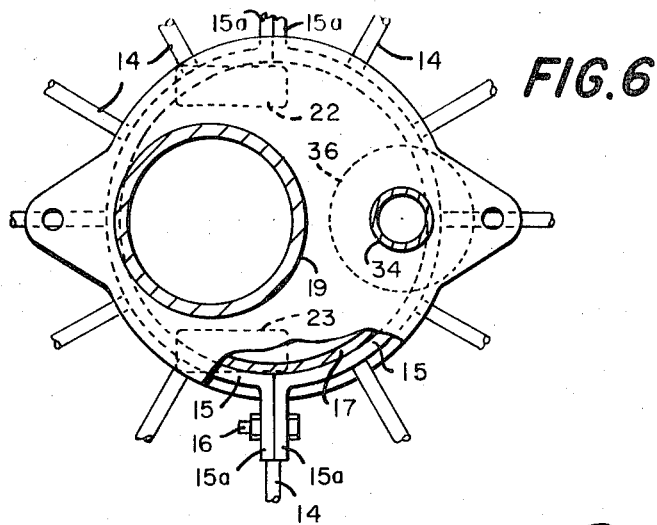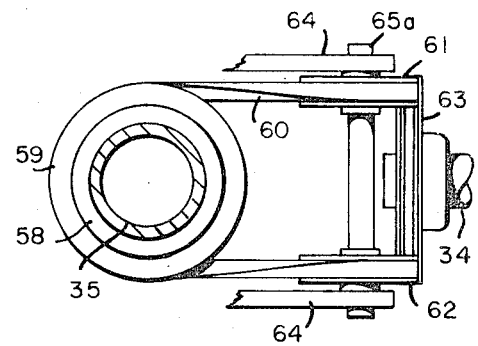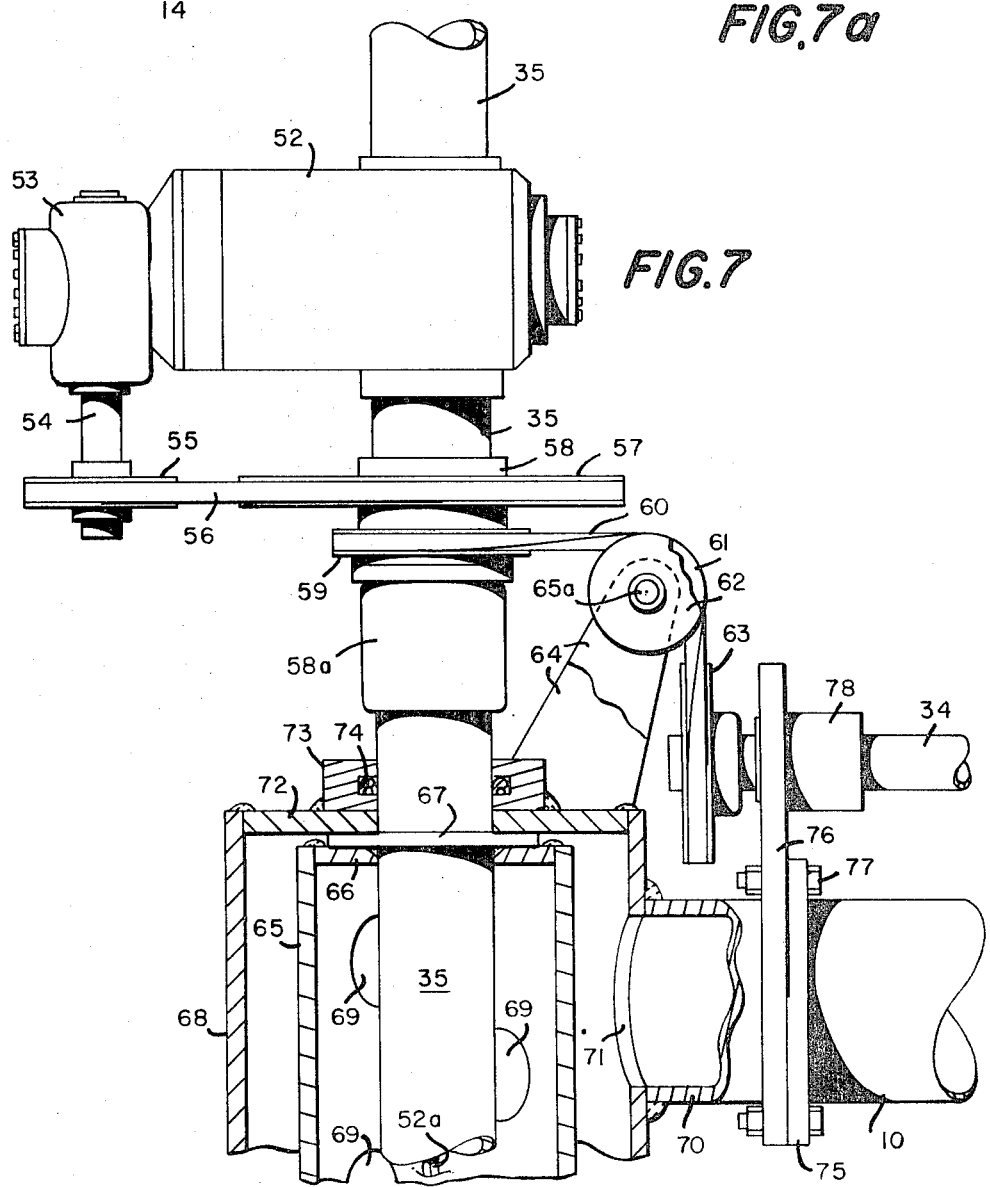

IRRIGATION SYSTEM

DESCRIPTION OF THE INVENTION

This invention relates to an irrigation system in which the irrigation pipe is carried around a fixed water supply pipe by a plurality of spaced wheels driven from a common shaft.

An object of this invention is to provide an improved irrigation system that is economical to manufacture and efficient in operation.

Another object of this invention is to provide an improved irrigation system in which the irrigation pipe is carried around a fixed centrally located water supply pipe by a plurality of spaced wheels which are driven through a combined clutch and brake mechanism that is responsive to the flexing of the irrigation pipe so that the irrigation pipe is carried around the fixed pipe without damaging bending thereof.

Another object of this invention is to provide an improved irrigation system employing a long irrigation pipe supported at spaced points by wheels which are driven from a common drive shaft, said drive shaft being driven by a stationary electric motor that is supported on the water supply pipe which is connected to one end of the irrigation pipe and is located at the center of the field being irrigated.

Still another object of this invention is to provide an improved irrigation system employing an elongated irrigation pipe that is made is sections, adjacent ones of which are joined by coupling members that also include bearings for the hub wheels supporting the pipe at spaced points, said bearings also supporting the drive shaft and sheaves which are provided to the wheel driving mechanisms.

Other and further objects of this invention will be apparent to those skilled in the art to which it relates from the following specification, claims and drawing.

In accordance with this invention there is provided an irrigation system employing an elongated irrigation pipe which is carried around a fixed point by a plurality of wheels during the irrigation of the field lying around the fixed point. The water supply pipe is located at this fixed point and it is connected to one end of the irrigation pipe by a rotatable coupling. The wheels supporting the irrigation pipe are supported on bearings that are attached to members which form couplings between adjacent sections of the irrigation pipe and these bearing members also support the drive shaft which transmits the power to the drive mechanisms associated with each of the wheels supporting the irrigation pipe. The drive shaft is coupled to the electric motor which is supported on the fixed water supply pipe so that it does not turn around the water supply pipe as the irrigation pipe is carried around the supply pipe by the wheels provided thereto. The wheels are driven at different speeds depending upon the distance of the respective wheels from the fixed supply pipe and a combination clutch and brake mechanism is provided to selected ones of the wheels to control the drive of these wheels and maintain the irrigation pipe relatively straight so that excessive bending of the irrigation pipe is prevented.

Further details and features of this invention will be set forth in the following specification, claims and drawing in which, briefly:

FIG. 1 is a side view of this irrigation system showing the irrigation pipe and wheel drive shaft extending from a fixed point around which the irrigation pipe is carried by a plurality of supporting wheels;

FIG. 2 is a side view of one of the supporting wheels and the drive mechanism provided thereto;

FIG. 3 is a rear view of one of the wheels supporting the irrigation pipe and drive shaft;

FIG. 3a is a detailed view of the clutch and brake mechanism provided to the wheel shown in FIG. 3;

FIG. 6 is a sectional view taken along the lines 6—6 of FIG. 5;

FIG. 7 is a detail view partially in section of the electric motor and shaft drive mechanism; and FIG. 7a is a top view of a portion of the shaft drive mechanism as shown in FIG. 7.

Figure 5:
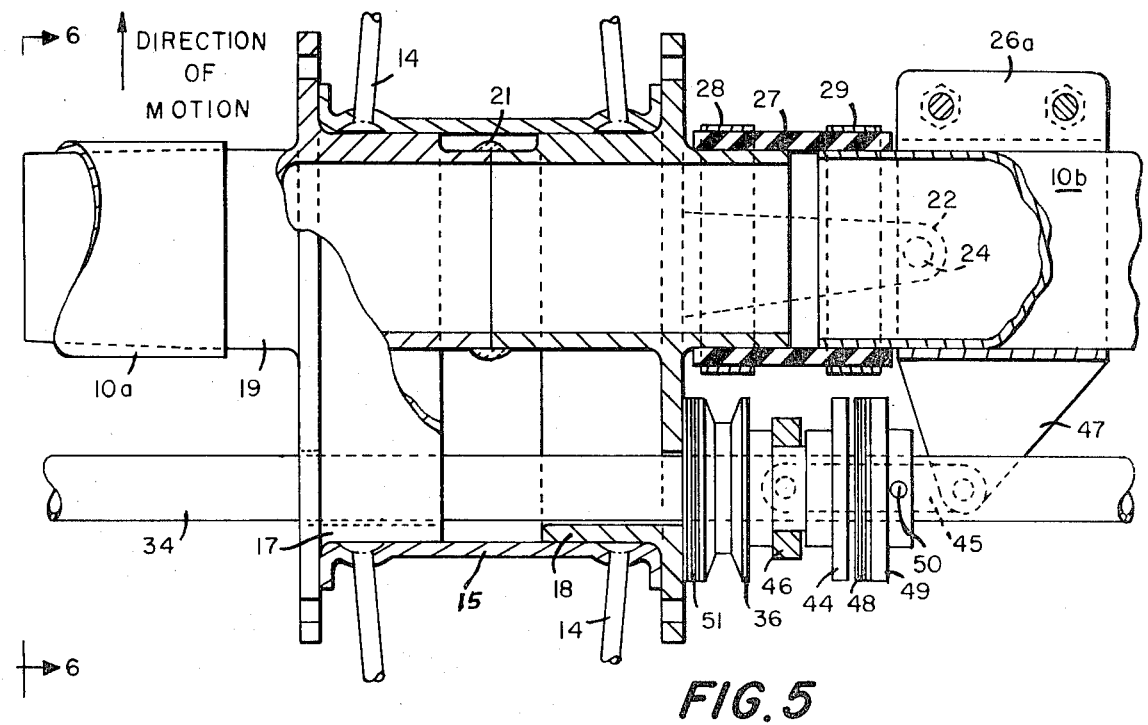
FIG. 5 is another view of the bearing shown in FIG. 4 and also showing the clutch and brake mechanism provided to the drive shaft adjacent to one side of the wheel bearing.
Figure 4:
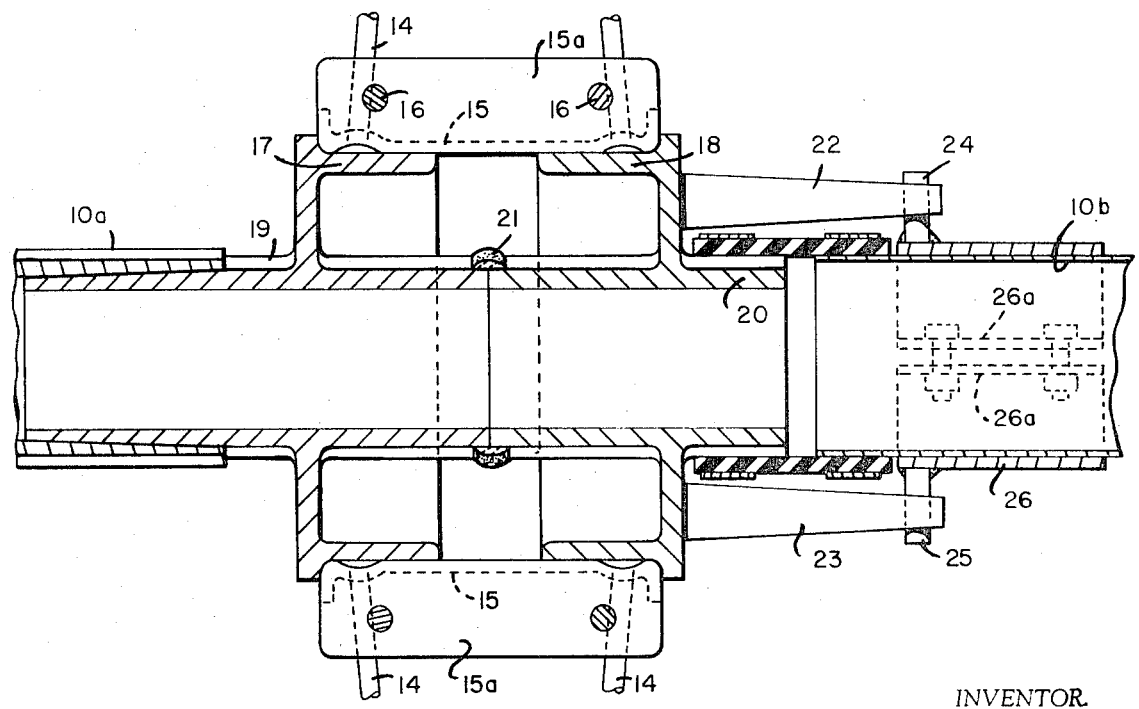
FIG. 4 is a sectional view of the wheel bearing attached to the pipe coupling provided between adjacent sections of the irrigation pipe.

Referring to FIG. 1 of the drawing in detail reference numeral 10 designates a long irrigation pipe which is made in sections joined together by coupling means such as shown in FIGS. 4 and 5. Pipe 10 is supported at spaced intervals by the wheels 11b, 11c, 11d and 11e such as the wheel 11 shown in FIGS. 2 and 3. Frame members 12 straddle the wheels 11 and are supported thereby. Cables 13 are attached to the tops of the frame members 12 and they are also attached to points of the irrigation pipe located between the frame members 12 so that support is provided to these points of the irrigation pipe as shown in FIG. 1.

The wheel 11 is provided with a plurality of spokes 14, the outer ends of which are attached to the rim of the wheel. The inner ends of the spokes 14 are attached to the circular hub member 15 as shown in FIGS. 4, 5 and 6. The wheel hub 15 is made in two semicircular parts which abut and the abutting ends of these parts are provided with flanges 15a which are bolted together by bolts 16 after the wheel is positioned on the circular bearing members 17 and 18. Rearwardly extending stabilizing members 12a may be attached to ears extending from the top and bottom of the members 17 and 18 as shown in FIG. 2 to hold the frame members erect if desired. A wheel 12b may be provided to members 12a. Before the wheel hub 15 is assembled on the bearing members 17 and 18 the pipe coupling sections 19 and 20 to which the respective bearing members 17 and 18 are attached are joined by welding or the like as indicated at 21.

The outer end of the pipe section 19 is tapered and the irrigation pipe section 10a is pressed thereon as shown in FIG. 4. Arms 22 and 23 are attached to a side of the bearing member 18 and these arms extend beyond the coupling section 20. The outer ends of the arms 22 and 23 are attached by pivot pins 24 and 25, respectively, to the collar 26 which is clamped to the irrigation pipe 10b by bolting the flanges 26a thereof together. A flexible hose 27 is provided between the coupling section 20 and the end of the irrigation pipe 10b so that pipe 10b may flex to a limited extent to coupling section 20. Suitable clamping bands 28 and 29 are provided around the flexible coupling 27 to clamp it to the pipe section 20 and the irrigation pipe 10b, respectively. Suitable adhesives such as epoxy resins or the like may be provided to seal this flexible coupling to the pipes, if desired.

The rims of the wheels 11 are provided with spaced holes 11a as shown in FIG. 3 which are uniformly spaced around the central portion of the wheel rim and which are adapted to receive the teeth of the drive pinion 30. Pinion 30 is attached to a shaft 31 that is journalled in the bearings 32 supported by the frame members 12. A relatively large wheel 33 is attached to the shaft 31 and this wheel forms a part of a speed reduction arrangement provided between shaft 31 and shaft 34 which is supported by bearings 34a along the irrigation pipe 10. Each of the wheels 11b to 11e supporting the irrigation pipe 10 is provided with a drive arrangement such as shown in FIGS. 2 and 3. Thus each wheel is provided with a speed reduction drive mechanism although this mechanism will provide different speed reductions for the different wheels because the wheels 11b, 11c, 11d and 11e must all rotate at different speeds with the wheel 11b rotating at a slower speed than the wheel 11e.

The speed reduction arrangement is provided with a small pulley 36 which is attached to the drive shaft 34 adjacent to the coupling 37. The drive shaft 34 because of its great length is made in sections which are coupled together by suitable couplings such as indicated at 37 and the small pulleys for driving the speed reduction arrangement provided to drive the wheels 11 are preferably positioned adjacent to the couplings between the shaft sections. The small pulley 36 drives the belt 38 which is provided between it and the large pulley 39 that is attached to the shaft 40. Shaft 40 is supported by a bearing 41 which is supported on the frame 12 by a suitable bracket. A small pulley 42 is also attached to the shaft 40 so that when the large pulley 39 is rotated by the belt 38 the small pulley 42 is also rotated and drives the belt 43 which is provided between it and the large pulley 33.

The small pulley 36 is attached to the clutch plate 44 shown in FIG. 3a. The pulley 36 and clutch plate 44 are movable on the drive shaft 34 by the linkage 45 shown in FIG. 5 that is attached to the yoke 46. Yoke 46 slidably engages the narrow neck between the pulley 36 and the clutch plate 44. The linkage 45 is also attached to the bracket 47 that is attached to the collar 26a provided around the pipe 10b. Thus if a section of pipe 10b flexes with respect to the pipe section 10a the bracket 47 moves the linkage 45. When the wheel carrying pipe sections 10a and 10b moves too slowly and these sections flex so that linkage 45 moves the pulley 36 and clutch plate 44 to the right, plate 44 engages the friction surface 48 that is attached to the clutch 49. Slippage at the clutch is reduced and the wheel carrying the pipe sections 10a and 10b is caused to turn more rapidly since clutch plate 44 engages the friction surface 48 more firmly. Clutch 49 is attached to the drive shaft 44 by the pin 50. The clutch then drives the pulley 36 and the wheel carrying the pipe sections 10a and 10b is caused to rotate through the operation of the speed reduction mechanism described previously.

If, on the other hand, the wheel carrying the pipe sections 10a and 10b is moving too rapidly then these pipe sections flex with respect to each other and the linkage 45 moves the pulley 36 and clutch plate 44 to the left thereby causing the clutch plate to slip with respect to the friction surface 48 or be disengaged therefrom and the left hand side of the pulley 36 is caused to engage the friction surface 51 which is attached to the outside of the wheel bearing member 18. The friction surface 51 acts as a brake on pulley 36 and slows the wheels carrying the pipe sections 10a and 10b down. The clutch, brake and flex responsive mechanism shown in FIG. 5 is provided to all of the wheels except the wheel at the outer end carrying the irrigation pipe so that these wheels are driven at the proper speed to carry the irrigation pipe around the center pipe 35 and prevent damaging bending in the irrigation pipe. In certain cases it may be desirable or necessary to provide an extension such as indicated at 36a in FIG. 3a between the pulley 36 and the brake 51.

The motor 52 that is used for driving the shaft 34 is supported on the the fixed pipe 35 as shown in FIG. 7 and the electrical connections 52a for supplying electric current to the motor are placed into this pipe. The motor 52 is provided with a reduction gearing 53 of conventional construction and this gearing is equipped with a shaft 54. A small pulley 55 is attached to the shaft 54 and this pulley drives the belt 56 which in turn drives the large pulley 57. Pulley 57 is attached to the sleeve 58 which is rotatably supported by the pipe 35. The small pulley 59 is also attached to the sleeve 58 and is driven by the pulley 57. Sleeve 58 bears against the thrust bearing 58a that is attached to pipe 35. The pulley 59 is provided with a belt 60 which passes over the idler pulleys 61 and 62 and drives the pulley 63 which is attached to the shaft 34.

The motor support pipe 35 extends down into the ground through the water pipe 65 and a closure plate 66 is welded to the top of the pipe 65. Plate 66 is welded to pipe 35 and also to pipe 65 and a thrust washer 67 is provided above this plate. Water is fed into pipe 68 from pipe 65 through holes 69 which are provided in the water pipe 65 and the water flows out of the pipe 68 into the irrigation pipe 10 through the coupling pipe 70 that is attached to the pipe 68 by welding it around the hole 71 formed in the pipe 68. A plate 72 is attached to the top of the pipe 68 by welding or the like and the seal enclosing member 73 is attached by welding to the top of the plate 72. The seal 74 is positioned in a cavity formed in the member 73 and engages the pipe 35 to provide a seal therewith. A similar plate and seal (not shown) is attached to the bottom of the pipe 68 except in this case the plate and seal are positioned around the water pipe 65. The irigation pipe 10 is provided with a flange 75 which is attached thereto by welding or the like and this flange is bolted to the flange 76 that is attached by welding or the like to the coupling pipe 70. Bolts 77 are provided for holding flanges 75 or 76 together. Flange 76 is provided with an upright portion which supports the bearing 78 attached thereto and bearing 78 rotatably supports the shaft 34 adjacent to pulley 63.

While I have shown a preferred form of the invention, it will be apparent that the invention is capable of variation and modification so that its scope should be limited by the scope of the claims appended hereto.

What I claim is:

1. In an irrigation system, the combination of an irrigation pipe comprising a plurality of pipe sections having apertures for spraying water therefrom to irrigate a field, a plurality of wheels supporting said irrigation pipe, said wheels being rotatably mounted on bearings provided to coupling means between adjacent ones of said pipe sections, means attached to one end of said pipe for coupling said pipe to a stationary water supply pipe, a drive shaft positioned along said irrigation pipe, means supporting said shaft on said irrigation pipe, a driving motor, a member supporting said motor, means coupling said motor to said drive shaft, means coupled to said drive shaft for driving each of said pipe supporting wheels, and means responsive to the flexing of said irrigation pipe at selected ones of said wheels, said last mentioned means including means controlling the driving of said selected wheels to prevent excessive bending of said irrigation pipe.

2. In an irrigation system, the combination as set forth in claim 1, further characterized in that each of said means controlling the driving of the selected wheels comprises a pulley rotatably mounted on said drive shaft and a clutch coupling said pulley to said drive so that said pulley is driven by said drive shaft when said clutch is engaged, the engaging of said clutch being controlled by said flex responsive means.

3. In an irrigation system, the combination as set forth in claim 2, further characterized in that said clutch comprises a clutch plate attached to said pulley and a clutch member attached to said drive shaft and friction means positioned between said plate and said clutch member to cause said clutch to grip when said plate is moved toward said clutch member.

4. In an irrigation system, the combination as set forth in claim 3, further characterized in that said flex responsive means comprises a linkage connecting said clutch plate to said irrigation pipe.

5. In an irrigation system, the combination as set forth in claim 1, further characterized in that said wheel bearings comprise circular surfaces attached to said pipe coupling means, each of said pipe coupling means having one end thereof connected to a section of said irrigation pipe by a flexible tubular member.

6. In an irrigation system, the combination as set forth in claim 1, further characterized in that said means controlling the driving of each of the selected wheels comprises a clutch and a brake, said brake being actuated by said flex responsive means when the selected wheel is moving the irrigation pipe too fast and said clutch being actuated by said flex responsive means to drive the selected wheel faster from said drive shaft when the selected wheel is moving the irrigation pipe too slowly.

7. In an irrigation system, the combination as set forth in claim 1, further characterized in that said means coupling said irrigation pipe to said water supply pipe comprises a rotatable coupling member encircling said water supply pipe, said stationary member supporting said motor above said water supply pipe.

8. In an irrigation system, the combination is set forth in claim 7, further characterized in that said means coupling said motor to said drive shaft comprises belt means driving said shaft and pulley means mounted on said rotatable coupling member guiding said belt means to said shaft as said shaft is carried around the fixed motor support.

9. In an irrigation system, the combination of an irrigation pipe comprising a plurality of pipe sections having apertures for spraying water therefrom to irrigate a field, a plurality of wheels supporting said irrigation pipe, said irrigation pipe forming an axle for said wheels so that said wheels rotate around said pipe, means attached to one end of said pipe for coupling said pipe to a stationary water supply pipe, a drive shaft positioned along said irrigation pipe, means supporting said shaft, a driving motor, a member supporting said motor, means coupling said motor to said drive shaft, means coupled to said drive shaft for driving each of said pipe supporting wheels, and means responsive to the flexing of said irrigation pipe at selected ones of said wheels, said last mentioned means including means controlling the driving of said selected wheels to prevent excessive bending of said irrigation pipe.

10. In an irrigation system, the combination as set forth in claim 1, further characterized in that said means supporting said drive shaft includes means substantially in the centers of said wheels supporting said drive shaft.

* * * * *